March 26, 1963   W. MÖLLER   3,082,628
STABILIZATION GYROSCOPE FOR FLYING CRAFT
Filed Sept. 14, 1959
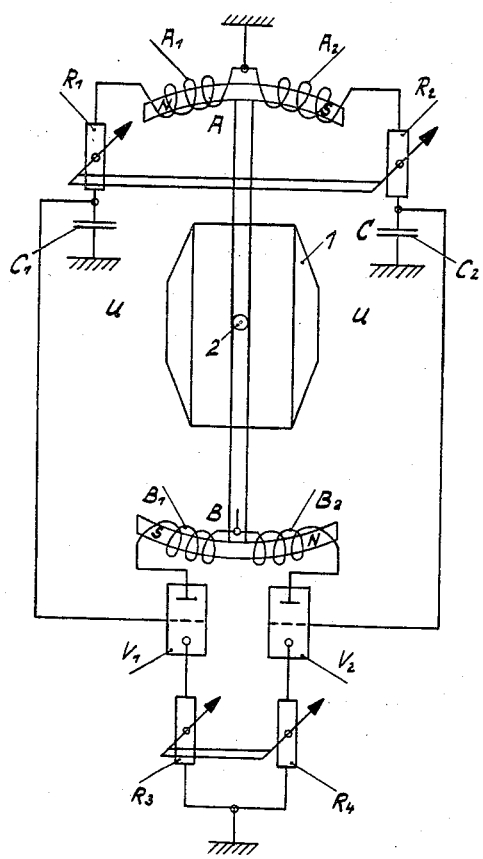
WALDEMAR MÖLLER
INVENTOR.
BY United States Patent Office 3,082,628
Patented Mar. 26, 1963

3,082,628
STABILIZATION GYROSCOPE FOR FLYING CRAFT
Waldemar Möller, Uberlingen (Bodensee), Germany, assignor to Bodenseewerk Perkin-Elmer u. Co., G.m.b.H., Uberlingen (Bodensee), Germany
Filed Sept. 14, 1959, Ser. No. 839,918
Claims priority, application Germany Sept. 16, 1958
4 Claims. (Cl. 74—5.4)

This invention is concerned with a gyroscope which serves as a control value transmitter for the stabilization of flying craft. As is well known, a precession momentum that is proportional to the angular speed about the axis of sensitivity is produced by stabilization gyros in the event of any change in the position of the flying craft. The deviation of the flying craft from its prescribed position can be obtained by integration of the gyro's precession velocity.

It is the object of the present invention to provide a stabilization gyro having simple and reliable electrical means to provide the control signals necessary for stabilization. This is done in such a manner that the controlling forces may be conveniently adapted to the properties of the flying craft and its speed.

According to the invention, this object is accomplished by coupling an inductive pickoff system and an electric torque transmitter with the precession axis of the gyro. The voltage induced in the pickoff system which is proportional to the angular velocity of the precession axis is impressed across the torque transmitter via an amplifier. The torque transmitter thereby generates a counter moment attenuating the precession movement. Under these conditions, a rotation takes place about the precession axis which is proportional to the change of position, i.e., the time integral of the precession moment. The integration constant depends on the amplifier influence, for example, the transconductance of the amplifier. It is therefore desirable to make the influence of the amplifier electrically variable and adjustable in order to provide for ease of adaptation. This can be achieved if the transconductance of the amplifier is made variable by means of an adjustable cathode resistor, for example.

It is normally necessary for the purpose of stabilization that a second value be superimposed upon the control value resulting from position deviation. This second value is proportional to the velocity of deviation, i.e., to the precession momentum itself. Normally, such a control value is obtained by fettering the precession axis to a central position by means of springs. A precession axis deflection is then obtained which is proportional to the speed of revolution about the axis of sensitivity. The constant of proportionality can be adjusted by varying the fettering springs. With a control gyroscope constructed and conceived according to the present invention, such spring fettering of the precession axis may be avoided by feeding the pickoff voltage into the amplifier via an adjustable RC circuit. The RC circuit has the effect of causing the counter-torque to come up with a certain delay and also to die down with retardation after the position deviation has come to an end. Thus, the RC circuit acts like a spring in which a certain amount of power is stored. By varying the resistance of the RC circuit, it is possible to adjust the spring constant of this "electric spring." With the arrangement described, a deflection of the precession axis is obtained which is composed of an integral component (change of position) and another component that corresponds to the velocity of deviation.

A stabilization gyroscope constituting a preferred embodiment of the present invention is illustrated schematically in the drawing together with the circuit diagram belonging thereto. The arrangement is more fully described in the following detailed description where reference is made to the drawing.

The gyro housing 1 comprises a gyro which revolves at high speed about the axis U—U. The gyro housing 1 is supported on the precession axis 2. A pickoff system A and a torque transmitter B are connected with the precession axis 2. The two systems A and B may be so designed that the coils $A_1$, $A_2$, $B_1$, $B_2$ form single coils of a cylindrical coil body. The cylindrical coil body may be arranged coaxially with the precession axis 2 in the air gap of a star shaped magnet as shown in my copending patent application Serial Number 826,719 filed July 13, 1959. For the sake of simplicity, however, the magnet is here shown to be movable about precession axis 2, while the coils $A_1$, $A_2$ and $B_1$, $B_2$ are stationary.

The coils $A_1$ and $A_2$ are connected to the negative pole of the plate voltage supply. The positive pole is connected to a corresponding point of the coil system $B_1$, $B_2$.

The other end of each of the coils $A_1$, $A_2$ is connected through an adjustable resistor $R_1$, $R_2$ to the grid of an amplifier tube $V_1$, $V_2$. Each of the adjustable resistors $R_1$, $R_2$ forms an RC circuit together with one grounded condenser $C_1$, $C_2$. The coils $B_1$ and $B_2$ are connected to the plates of the amplifier tubes $V_1$ and $V_2$. The cathodes of the amplifier tubes $V_1$, $V_2$ are ground connected through adjustable resistors $R_3$ and $R_4$. The adjusting device of the symmetrically arranged resistors $R_1$ and $R_2$ are mechanically connected with each other. The same applies to the resistors $R_3$ and $R_4$.

With undisturbed flight, no moments whatsoever are exerted on the gyroscope since the plate currents of the amplifier tubes $V_1$ and $V_2$ cancel each other when flowing through the coils $B_1$ and $B_2$. If, however, there is any deviation of the flying craft from its prescribed position, a precession movement of the gyro about the precession axis 2 is produced and the equilibrium existing on the double-amplifier, $V_1$, $V_2$ is disturbed. A voltage is induced in the pickoff system A which is proportional to the speed of revolution about precession axis 2. If the RC circuits $R_1$, $C_1$ and $R_2$, $C_2$ were not present, the influence of the voltages produced by system A impressed across the tube grids, would cause an unbalance of the plate currents flowing through the coils $B_1$ and $B_2$. A proportional counter torque would be immediately exerted about precession axis 2 which would attenuate the precession movement. The gyro would then act as a real integration gyroscope. Its rotation about the precession axis 2 would correspond to the position variation of the flying craft. The integration constant would be adjusted by varying the resistances $R_3$ and $R_4$ since the transconductance of the double-amplifier $V_1$, $V_2$ and thus the countermoment would vary with the resistances $R_3$ and $R_4$.

As a consequence of the presence of the RC circuits, the countermoment increases with a certain time delay and also dies down with a time delay. In this way, an additional component, which is proportional to the precession momentum, and which depends on the adjustment of the RC circuits $R_1$, $C_1$ and $R_2$, $C_2$, is superimposed on the rotation of the gyro about its precession axis.

I claim:

1. A stabilization gyroscope which comprises electrical coil means; magnetic means in flux-linking relationship to said coil means; mechanical means operable about the axis of precession adapted to provide relative motion between said coil means and said magnetic means to generate an electrical signal proportional to the precession velocity of said gyroscope; and torquing means responsive to said electrical signal in attenuating relationship with the precession rotation.

2. The apparatus of claim 1 wherein the torquing means includes RC circuit means.

3. A stabilization gyroscope which comprises gyro rotor means rotatable about a first axis; rotor housing means enclosing said rotor and supporting said first axis therein; means for rotating all of said rotor means and said housing means about a second axis perpendicular to said first axis; electrical generating means comprising first magnet means and first electrical coil means adapted for relative motion therebetween; means for providing such relative motion in accordance with the rotation of said housing means about said second axis to generate a first voltage responsive to the speed of said rotation; electrical torque motor means comprising second magnet means and second electrical coil means adapted for relative motion therebetween; amplifying means adapted to receive said first voltage and provide a second voltage to said torque motor means proportional thereto; and means for applying the mechanical output of said torque motor means to said housing to attenuate the rotation of said housing about said second axis.

4. The apparatus of claim 3 wherein resistor means are provided in series and capacitor means are provided in parallel with said electrical generating means.

References Cited in the file of this patent

UNITED STATES PATENTS

| | | |
|---|---|---|
| 2,429,612 | Curry | Oct. 28, 1947 |
| 2,709,921 | Sylvan | June 7, 1955 |
| 2,752,790 | Draper | July 3, 1956 |
| 2,766,627 | Lower et al. | Oct. 16, 1956 |
| 2,787,909 | Ruckstahl et al. | Apr. 9, 1957 |
| 2,899,828 | Lynn | Aug. 18, 1959 |
| 2,948,155 | Burkam | Aug. 9, 1960 |